United States Patent
Xie et al.

(10) Patent No.: US 11,261,797 B2
(45) Date of Patent: Mar. 1, 2022

(54) SYSTEM AND METHOD FOR CLEANING, RESTORING, AND PROTECTING GAS TURBINE ENGINE COMPONENTS

(71) Applicant: General Electric Company, Schenectady, NY (US)

(72) Inventors: Liangde Xie, Mason, OH (US); Ambarish Jayant Kulkarni, Glenville, NY (US); Byron Andrew Pritchard, Jr., Loveland, OH (US); Matthew Charles Sabo, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 149 days.

(21) Appl. No.: 16/180,459

(22) Filed: Nov. 5, 2018

(65) Prior Publication Data
US 2020/0141325 A1    May 7, 2020

(51) Int. Cl.
*F02C 7/00* (2006.01)
*F02C 7/30* (2006.01)
*F02C 7/22* (2006.01)

(52) U.S. Cl.
CPC .............. *F02C 7/30* (2013.01); *F02C 7/22* (2013.01); *F05D 2260/607* (2013.01)

(58) Field of Classification Search
CPC ........ F02C 7/30; F02C 7/22; F05D 2260/607; F05D 2260/95; F05D 2300/6033; F01D 25/002; F01D 25/007; F23R 3/007
See application file for complete search history.

(56) References Cited

U.S. PATENT DOCUMENTS

| | | |
|---|---|---|
| 3,751,297 A | 8/1973 | Minbiole, Jr. et al. |
| 4,671,230 A | 6/1987 | Turnispeed |
| 4,834,912 A | 5/1989 | Hodgens, II et al. |
| 4,995,915 A | 2/1991 | Sewell et al. |
| 5,809,771 A | 9/1998 | Wernberg |
| 7,523,603 B2 | 4/2009 | Hagen et al. |
| 7,674,341 B2 | 3/2010 | Stansilaw et al. |
| 7,964,027 B2 | 6/2011 | Hauzer et al. |
| 8,192,688 B2 | 6/2012 | Hagen et al. |
| 8,632,638 B2 | 1/2014 | Simpson-Green et al. |
| 8,741,381 B2 | 6/2014 | Zhang et al. |
| 9,175,606 B2 | 11/2015 | Bassmann et al. |
| 9,239,013 B2 | 1/2016 | Zhang et al. |
| 2009/0180939 A1 | 7/2009 | Hagen et al. |
| 2011/0289927 A1 | 12/2011 | Wagner |
| 2013/0330172 A1 | 12/2013 | Scipio et al. |
| 2015/0354403 A1 | 12/2015 | Ekanayake et al. |
| 2017/0167290 A1 | 6/2017 | Kulkarni et al. |
| 2017/0191376 A1 | 7/2017 | Eriksen et al. |
| 2017/0254218 A1 | 9/2017 | Bewlay et al. |
| 2017/0329307 A1 | 11/2017 | Castillo-Effen et al. |
| 2018/0245477 A1 | 8/2018 | Kulkarni et al. |

OTHER PUBLICATIONS

European Search Report Corresponding to Application No. 19206240 dated Mar. 17, 2020.

*Primary Examiner* — Katheryn A Malatek
(74) *Attorney, Agent, or Firm* — Fitch, Even, Tabin & Flannery LLP

(57) ABSTRACT

A vapor-based system and method for treating one or more components of a gas turbine engine. The system includes a treatment compound contained in a storage vessel. The storage vessel being operably coupled to a delivery module. The delivery module delivering the treatment compound at one or more locations of the gas turbine engine such that the treatment compound is a vapor when exposed to an engine air-path.

19 Claims, 8 Drawing Sheets

SYSTEM AND METHOD FOR CLEANING, RESTORING, AND PROTECTING GAS TURBINE ENGINE COMPONENTS

FIELD

The present subject matter relates generally to gas turbine engines, and more particularly, to systems and methods for treatment of gas turbine engine components using a vaporization and condensation process.

BACKGROUND

A typical aircraft-mounted gas turbine engine includes gas turbine engine components having very fine cooling passages that allow for higher gas temperatures in the combustor and/or the high-pressure or low-pressure turbines. During operation, particularly in environments that contain fine-scale dust, environmental particulate accumulates on engine components and within the cooling passages of the engine. For example, dust (reacted or non-reacted), sand, or similar can build up on the flow path components and on the impingement cooled surfaces during turbine engine operation. In addition, particulate matter entrained in the air that enters the turbine engine and the cooling passages can contain sulfur-containing species that can corrode the components. Such accumulation can lead to reduced cooling effectiveness of the components and/or corrosive reaction with the metals and/or coatings of the engine components. Thus, particulate build-up can lead to premature distress and/or reduced engine life. Additionally, accumulations of environmental contaminants (e.g. dust-reacted and unreacted, sand, etc.) can degrade aerodynamic performance of the high-pressure components and lower fuel efficiency of the engine through changes in airfoil morphology.

Current approaches for treating fully assembled engines generally rely on foam or liquids. However, the physical characteristics of the treating medium impose limits on the engine surfaces which may be affected by the treating medium. For example, it is desirable to treat the cooling air passages of a jet engine. The cooling air passages have holes in the outer faces of combustors and turbines which have a diameter of approximately 1 mm. The known treatment foams have bubbles which are two to ten times larger than these openings. As such, the bubble diameter prevents the foam from entering the cooling air passages, and thus the foams are not suitable for treating the cooling air passages. Liquid-based treatments, on the other hand, may have components small enough to pass through the cooling holes, but have a different set of limitations. Liquid treatments are driven by rotational speeds or gravity. This tends to concentrate the liquid in the outer diameter when the gas turbine engine is rotating or near the bottom of a static engine. In neither case will the liquid tend to flow uniformly through all the circuits of the cooling air passages.

Accordingly, a need exists for an improved method to clean gas turbine engine components.

BRIEF DESCRIPTION

Aspects and advantages of the invention will be set forth in part in the following description, or may be obvious from the description, or may be learned through practice of the invention.

In accordance with one embodiment of the present disclosure, a vapor-based system for treating one or more components of a gas turbine engine is provided. The system may include a treatment compound having a delivery temperature for a corresponding delivery pressure. The delivery temperature may be greater than an engine component surface temperature. The system may include a storage vessel containing the treatment compound. A delivery module may be operably coupled to the storage vessel and to an engine access point. The delivery module may be operable to deliver the treatment compound at one or more locations of the gas turbine engine such that the treatment compound is a vapor when exposed to an engine air-path so as to treat the engine component.

In accordance with another embodiment of the present disclosure, a method for treating one or more components of an aircraft-mounted gas turbine engine is provided. The method may include operably coupling a delivery module, which may also be coupled to a storage vessel, to an engine access point. The delivery module may be activated to deliver a portion of a treatment compound to the engine access point. The treatment compound may be a supersaturated vapor upon entering an engine air-path. The supersaturated vapor may have a delivery temperature for a corresponding a delivery pressure. The delivery temperature is greater than a surface temperature of a component surface such that the vapor may change phase on the component surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
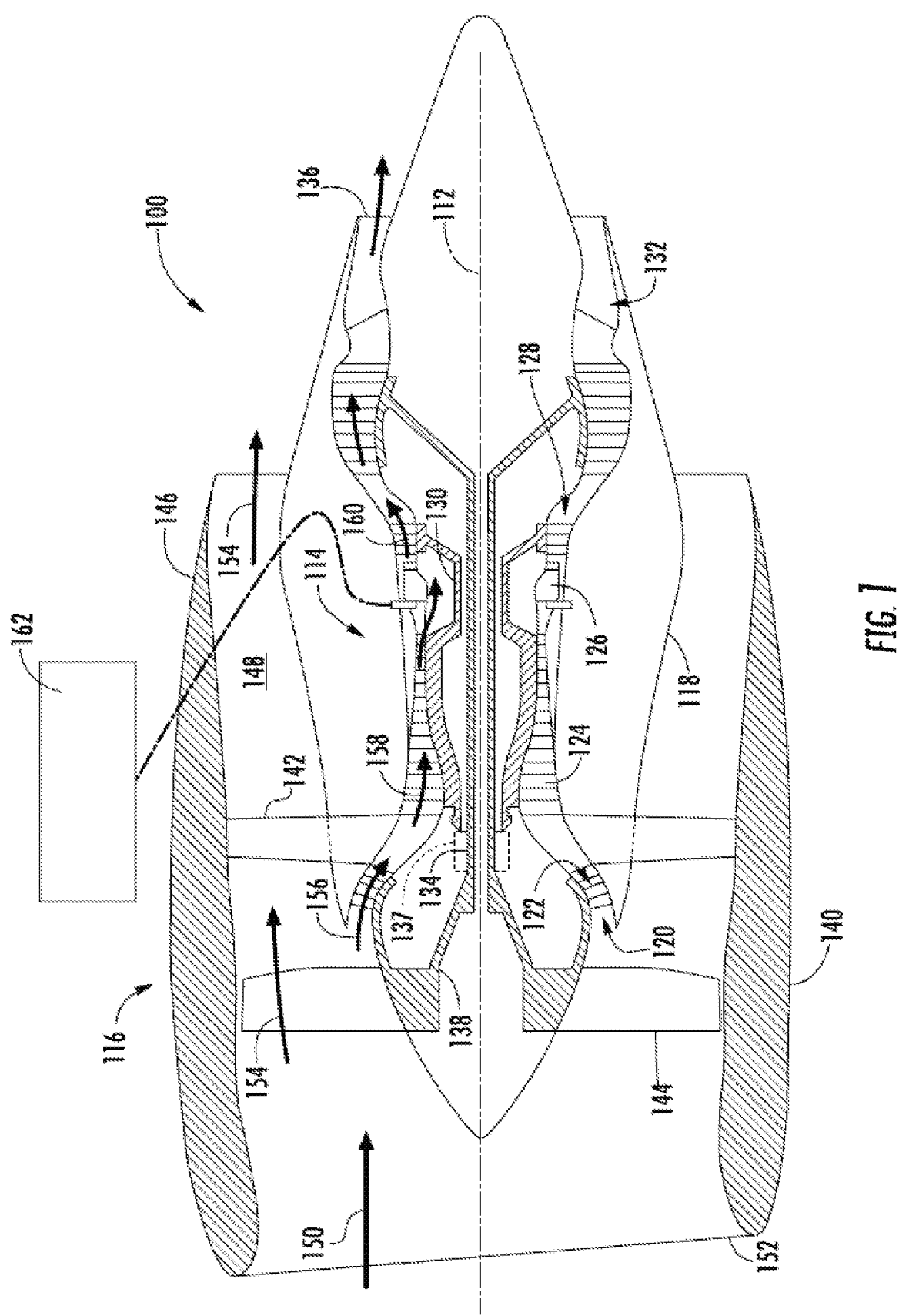
FIG. 1 shows a schematic cross-sectional view of one embodiment of a gas turbine engine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component from another and are not intended to signify location or importance of the individual components.

As used herein, the term "vapor" refers to a substance in the gaseous state, as distinguished from the liquid or solid state.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the phrases "constructed of CMCs" and "comprised of CMCs" shall mean components substantially constructed of CMCs. More specifically, the CMC components shall include more CMC material than just a layer or coating of CMC materials. For example, the components constructed of CMCs may be comprised or constructed substantially or entirely of CMC materials, including greater than about 50, 60, 70, 80, 90, or 100 percent CMC material.

Methods and systems are generally provided for treating gas turbine engine components, even in an assembled, in-situ engine. The methods of the present disclosure generally provide for delivery of a treatment compound in a vapor form. Being in a vapor form, the treatment compound more thoroughly penetrates an assembled gas turbine engine (as compared to liquid or foam-based treatment systems), allowing the treatment compound to affect engine components not readily accessible using current in-situ engine cleaning approaches.

To achieve the desired effect, the treatment compound is heated to a delivery temperature and a delivery pressure prior to delivery to the gas turbine engine. For example, if the treatment compound is water based, it is generally heated to a delivery temperature from 95° C. to 260° C. and a delivery pressure from 10 kPa to 3,500 kPa. The gas turbine engine to be treated may be at a standard atmosphere of 15° C. at 101.325 kPa. Upon delivery to the gas turbine engine, the treatment compound encounters lower pressure and temperature conditions than the delivery pressure and temperature, such that the treatment compound vaporizes (if not already a vapor). Because the water-based treatment compound has a delivery pressure (partial pressure) from 103 kPa to 3,447 kPa, and the saturation pressure of a water-based compound at 15° C. is about 1.705 kPa, the resultant vapor may be supersaturated. The term "supersaturated," as used herein, refers to a vapor of a compound that has a higher partial pressure than the vapor pressure of the compound.

The vapor has a portion of suspended droplets having a range of diameters from 1 μm to 100 μm (e.g., from 5 μm to 30 μm). As the vapor (which may be supersaturated) is driven through the gas turbine engine by the delivery module, the vapor encounters engine surface components and begins to condense thereon. Because the diameter of the droplets formed in the vapor may be less than 35 μm (e.g., from 5 μm to 30 μm), the droplets are able to reach the targeted surfaces of the gas turbine engine unreachable by droplets having larger diameters.

Referring now to the drawings, FIG. 1 illustrates a cross-sectional view of one embodiment of a gas turbine engine 100 that may be utilized with an aircraft in accordance with aspects of the present subject matter, the engine 100 is shown having a longitudinal or axial centerline axis 112 extending therethrough for reference purposes. The engine 100 will be discussed in detail below. Although shown as a turbofan jet engine, the methods described herein may be used on any turbomachine including, but not limited to, high-bypass turbofan engines, low-bypass turbofan engines, turbojet engines, turboprop engines, turboshaft engines, propfan engines, and so forth.

Figure 2:
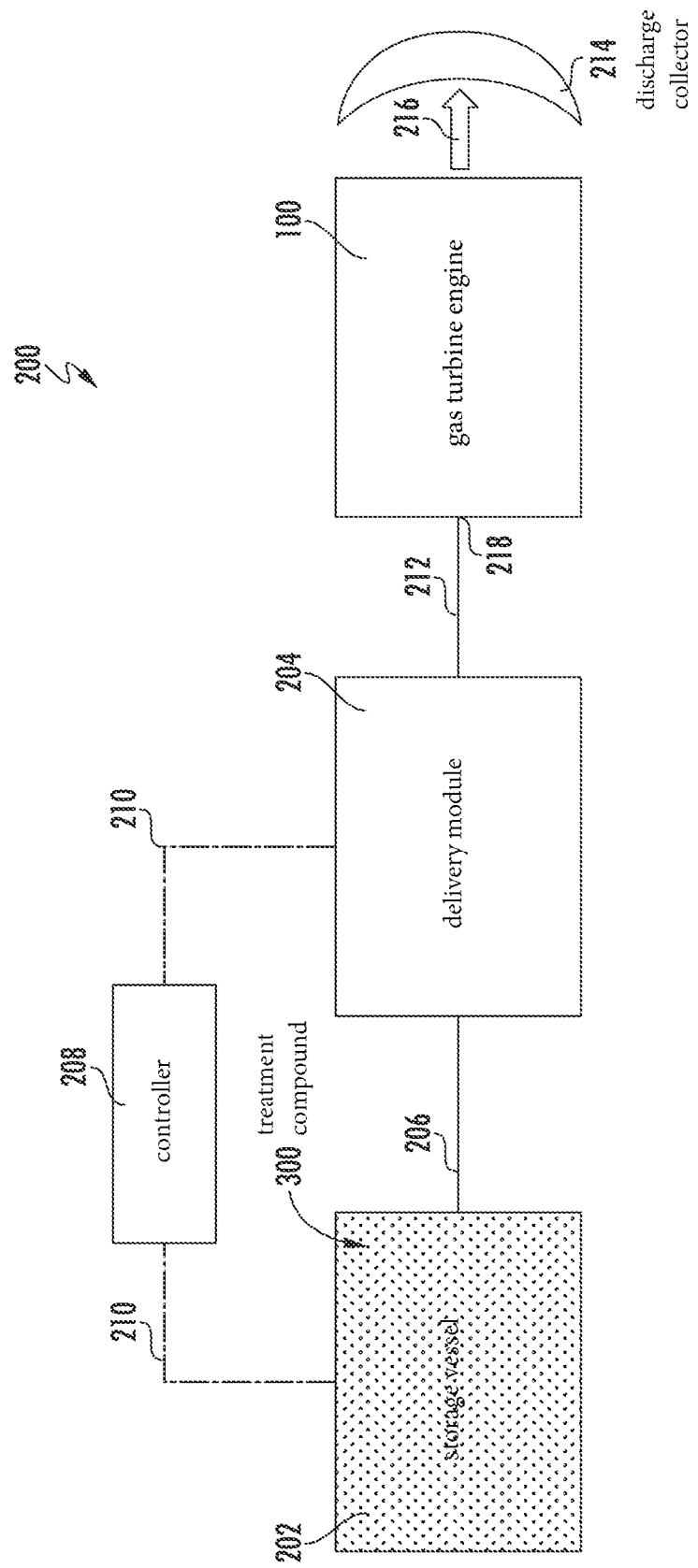
FIG. 2 shows a schematic view of an exemplary vapor-based system for the cleaning, restoration, and protection of the exemplary gas turbine engine of FIG. 1.

FIG. 2 illustrates a schematic view of one embodiment of a vapor-based treatment system 200 for treating of one or more components of a gas turbine engine 100 in accordance with aspects of the present subject matter. In the illustrated embodiment, the treatment system 200 includes, a treatment compound 300 contained in a storage vessel 202. The storage vessel 202 is operably coupled to a delivery module 204 via coupling 206. In some embodiments, a controller 208 is communicatively coupled to the delivery module 204 and the storage vessel 202 via communications link 210 to manage the delivery of the treatment compound 300 to the gas turbine engine 100. The delivery of the treatment compound 300 to the gas turbine engine 100, even in-situ, is accomplished via a delivery passage 212 coupled to an engine access point 218. It should be appreciated that the delivery passage 212 may be, but is not limited to, a hose, a pipe, a conduit, a duct, an encapsulation, or an atmospheric passage defined by a portion of moving air. In certain embodiments, a discharge collector 214 is positioned to collect a treatment system waste fluid 216.

Referring still to FIG. 2, the treatment compound 300 may be in any desirable phase of matter when stored in the storage vessel 202 but is a supersaturated vapor upon entry into the gas turbine engine 100. Also, the treatment compound may be any compound designed to affect encountered gas turbine engine components. For example, the treatment compound may be a cleaning agent, a restorative agent, or a protective agent. Additionally, the treatment compound may be specifically formulated to affect the encountered gas turbine engine component based on the material makeup of the component. For example, in an embodiment in accordance with aspects of the present disclosure, the treatment compound may be formulated as a restorative compound compatible with an outer coating of a CMC composite. In still other embodiments, the treatment compound may be a protective compound compatible with an outer coating of a flow path component.

In an exemplary embodiment in accordance with aspects of the present disclosure, the treatment compound 300 may be a liquid at room temperature and is heated to a delivery temperature from 93° C. to 260° C. and a delivery pressure from 103 kPa to 3,447 kPa prior to introduction into the gas turbine engine 100. For example, the gas turbine engine 100 may be at a standard atmospheric temperature and pressure of 15° C. at 101.325 kPa and the liquid treatment compound 300 may be brought to about 149° C. and held at about 758 kPa. As the treatment compound 300 is introduced to the gas turbine engine 100 by the delivery module 204 (which is liquid delivery module in this exemplary embodiment), the stepdown to a lower pressure causes the treatment compound 300 to vaporize or "flash," resulting in a supersaturated vapor. In such an example, the liquid treatment compound 300 at about 149° C. and about 758 kPa would experience about a 657 kPa pressure differential at the instant of introduction, instantly vaporize, yet remain at about 149° C. As the vapor begins to cool, the vapor develops droplets having a diameter of less than 35 µm (e.g., from 5 µm to 30 µm). Because of this small droplet diameter, the vapor is able to permeate the engine, especially the plurality of cooling passages. As the vapor encounters gas turbine engine 100 components, a portion of the treatment compound changes phase and condenses on the encountered surface. In some embodiments, this condensed treatment compound 300, may be further dispersed by motoring (i.e., rotating without fuel) the gas turbine engine 100.

In an additional exemplary embodiment in accordance with aspects of the present disclosure, the treatment compound 300, unlike the exemplary embodiment above, may be a vapor which is brought to a delivery temperature from 93° C. to 260° C. and a delivery pressure from 103 kPa to 3,447 kPa prior to introduction into the gas turbine engine 100. As the treatment compound 300 is already a vapor in this embodiment, the introduction into the gas turbine engine 100 does not drive a phase change.

However, as the vapor begins to cool, the vapor develops droplets having a diameter of less than 35 µm (e.g., from 5 µm to 30 µm). Because of this small droplet diameter, the vapor is able to permeate the engine, especially the plurality of cooling passages. As the vapor encounters gas turbine engine 100 components, a portion of the treatment compound changes phase and condenses on the encountered surface.

It should be appreciated that delivering the treatment compound 300 in a vapor form in accordance with an aspect of the present disclosure may be particularly advantageous, ensuring the treatment compound 300 reaches the desired engine components. For example, the utilization of a vapor allows the treatment compound 300 to reach engine components which are unreachable by traditional solution or slurry approaches due to the absence of a line of sight to the component. Additionally, by employing a vapor, the engine access point 218 may be any engine orifice including, but not limited to, an inlet 152 (FIG. 1) of the fan casing 140 (FIG. 1), a borescope inspection port, a component of the fuel system 162 (FIG. 1) or an exhaust nozzle 136 (FIG. 1). It should also be recognized that composition of the treatment compound determines the range of temperatures and pressures required to drive a supersaturation condition within the compound. For example, while water-based compounds have a temperature range from 95° C. to 260° C., alcohol-based solutions may have a delivery temperature from 75° C. to 250° C. at the same delivery pressures.

Figure 3:
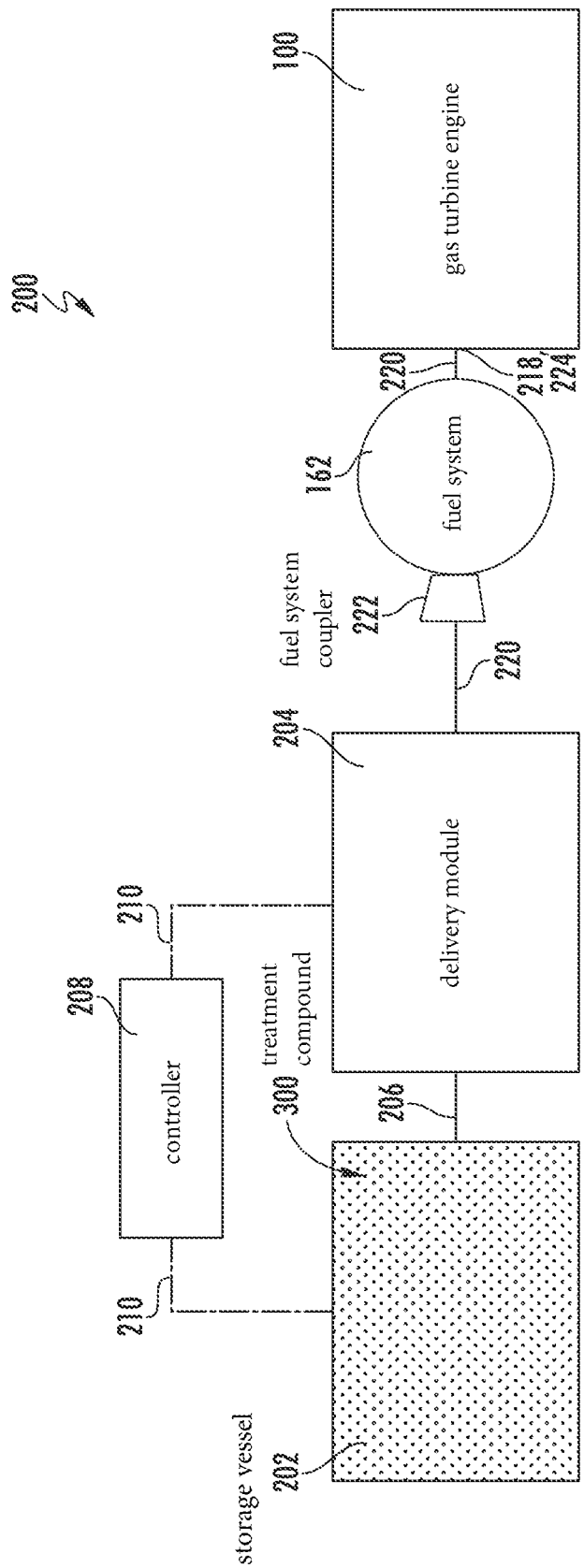
FIG. 3 shows a schematic view of an embodiment of the exemplary system shown in FIG. 2, coupled to a fuel delivery system.

FIG. 3 illustrates a schematic view of one embodiment of a treatment system 200 for treating one or more components of a gas turbine engine 100 in accordance with aspects of the present subject matter. In the depicted embodiment, the delivery module 204 is fluidly coupled via a hose 220 to a fuel system coupler 222. The fuel system coupler 222 is operably coupled to the gas turbine engine's 100 fuel system 162. The fuel system 162 includes a plurality of hoses 220 and fuel injector nozzles 224 coupled to the gas turbine engine 100. In such an embodiment, the delivery module 204 delivers a portion of the treatment compound 300 through the fuel system 162 to be dispersed by the fuel injector nozzles 224 into the combustors 126 (FIG. 1) of the gas turbine engine 100.

Figure 4:
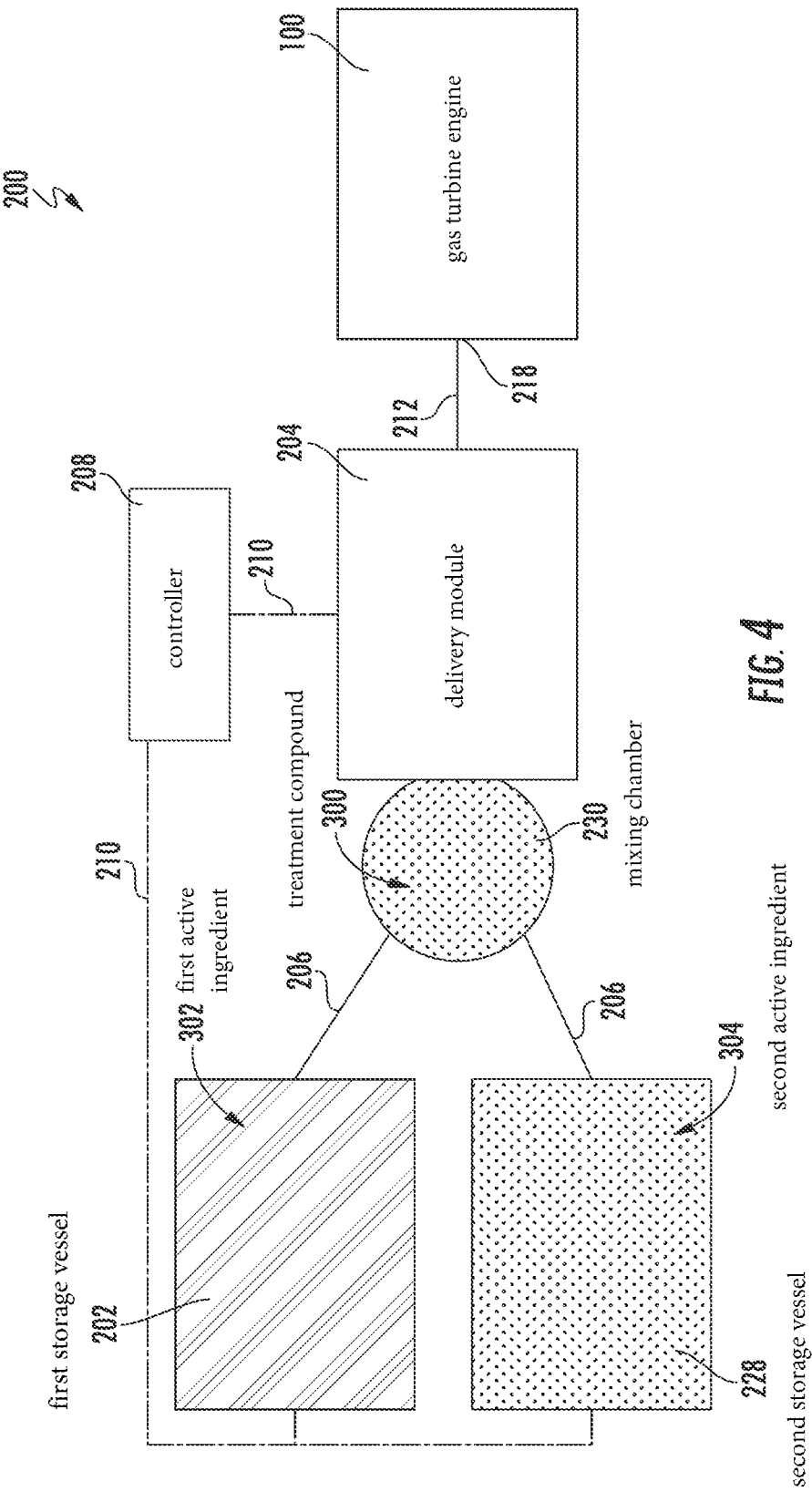
FIG. 4 shows a schematic view of an embodiment of the exemplary system shown in FIG. 2, particularly illustrating a first active ingredient being stored separately from a second active ingredient.

FIG. 4 illustrates a schematic view of one embodiment of a treatment system 200 for treating one or more components of a gas turbine engine 100 in accordance with aspects of the present subject matter. As illustrated, the treatment system 200 includes, a first storage vessel 202 and a second storage vessel 228, and the treatment compound 300 includes a first active ingredient 302 and a second active ingredient 304. The first active ingredient is contained in the first storage vessel 202, and the second active ingredient 304 is contained in the second storage vessel 228. As shown in FIG. 4, the delivery module 204 of this embodiment also includes a mixing chamber 230. At the direction of the controller 208, the mixing chamber 230 mixes a portion of the first active ingredient 302 with a portion of the second active ingredient 304 to produce the treatment compound 300.

Figure 5:
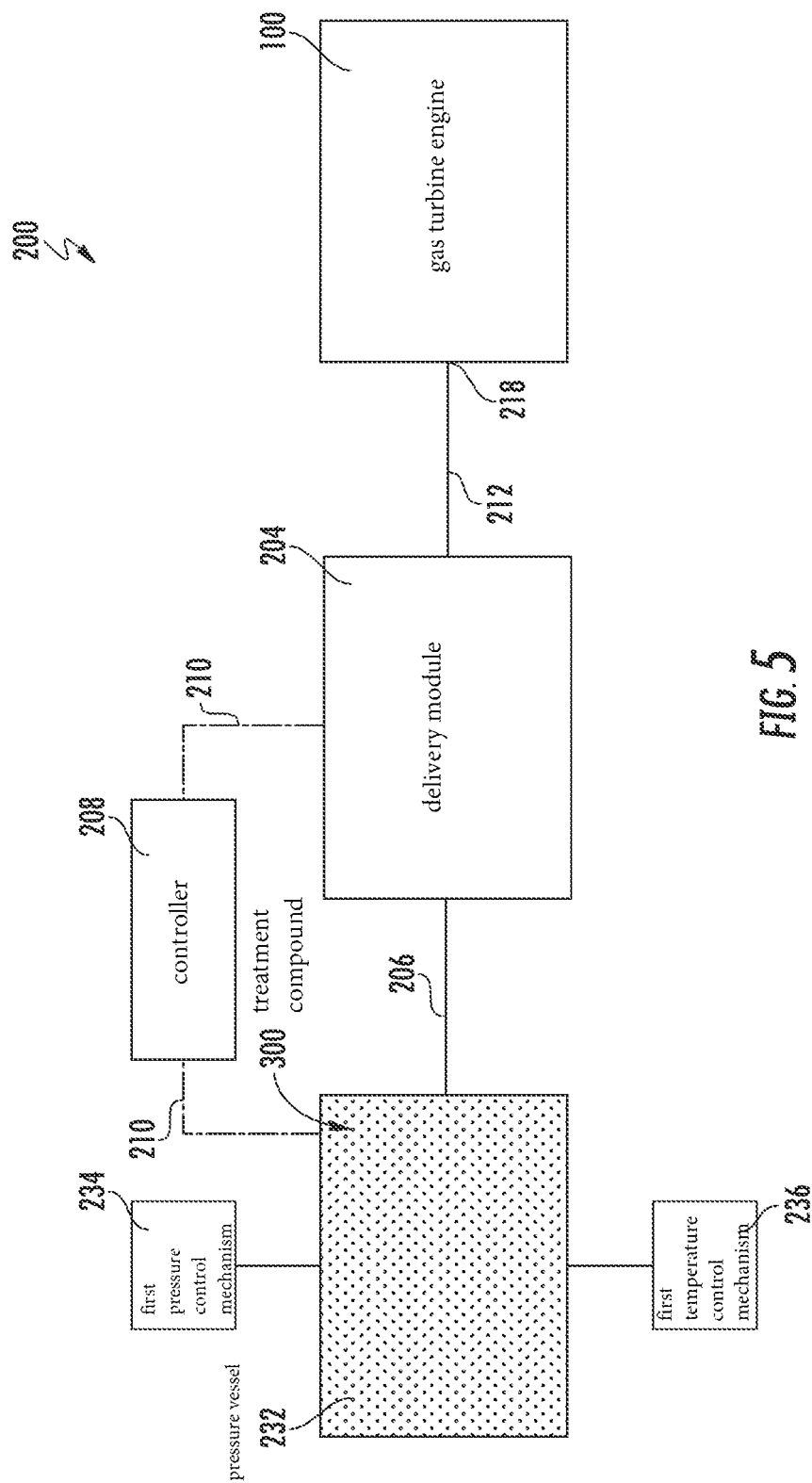
FIG. 5 shows a schematic view of an embodiment of the exemplary system shown in FIG. 2, particularly illustrating a vapor storage system.

FIG. 5 illustrates a schematic view of one embodiment of a treatment system 200 for treating one or more components of a gas turbine engine 100 in accordance with aspects of the present subject matter. In the illustrated embodiment, the treatment system 200 includes a storage vessel (FIG. 2, 202), which is a pressure vessel 232. The pressure vessel 232 holds a portion of the treatment compound 300 in a vapor phase. To maintain the treatment compound 300 as a vapor, a pressure control mechanism 234 and a temperature control mechanism 236 are coupled to the pressure vessel 232. In the exemplary embodiment, the treatment compound 300 is delivered as a vapor to the gas turbine engine 100 by the delivery module 204.

Figure 6:
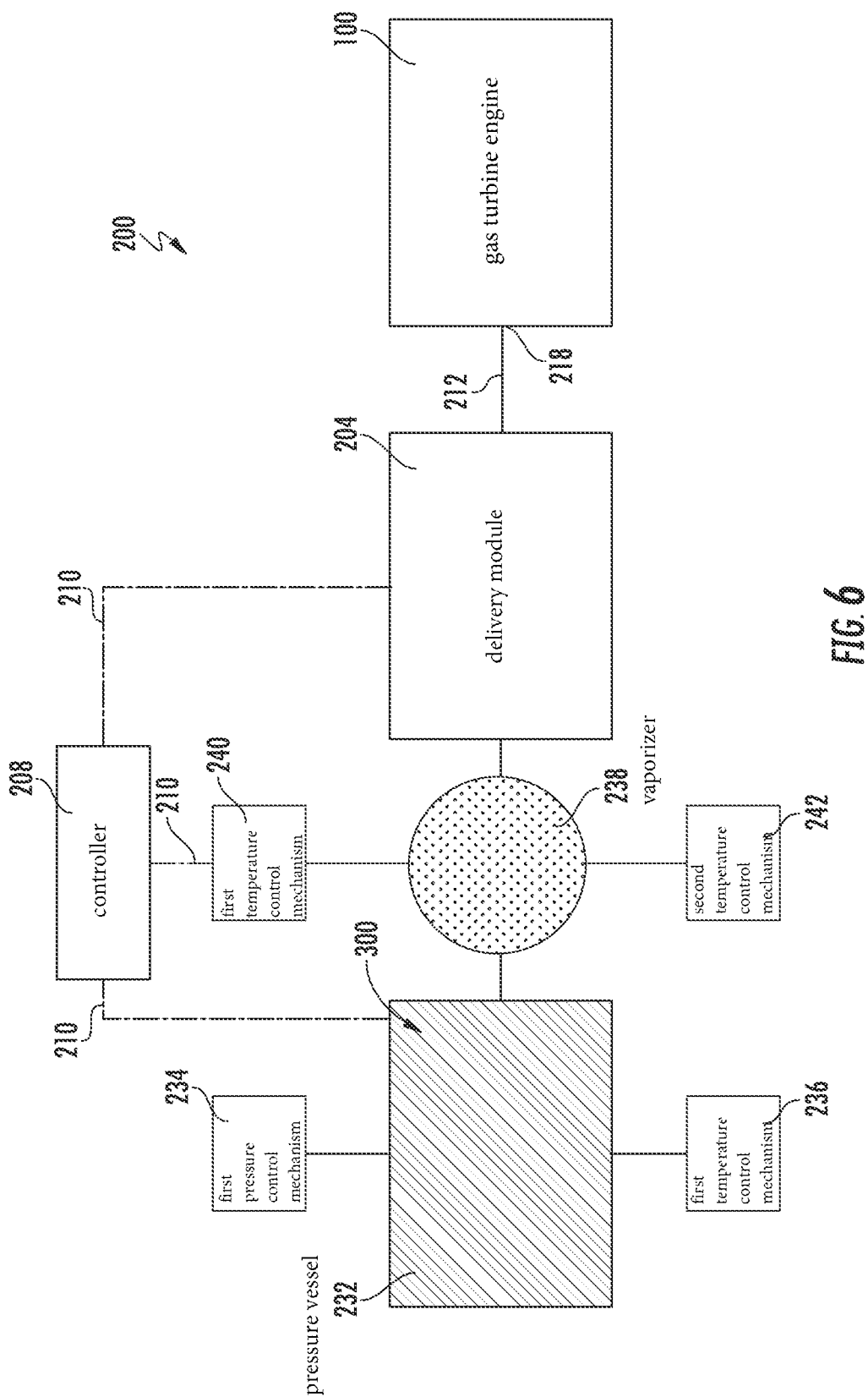
FIG. 6. shows a schematic view of an embodiment of the exemplary system shown in FIG. 2, particularly illustrating the addition of a vaporizer.

FIG. 6 illustrates a schematic view of one embodiment of a treatment system 200 for treating one or more components of a gas turbine engine 100 in accordance with aspects of the present subject matter. In the illustrated embodiment, the treatment system 200 includes a storage vessel (FIG. 2, 202), which is a pressure vessel 232. The pressure vessel 232 holds a portion of the treatment compound 300 in a liquid form. To maintain the treatment compound 300 as a liquid, a first pressure control mechanism 234 and a first temperature control mechanism 236 are coupled to the pressure vessel 232. A vaporizer 238 is operably coupled between the pressure vessel 232 and the delivery module 204. A second pressure control mechanism 240 and a second temperature control mechanism 242 are operably coupled to the vaporizer 238 to establish vaporizations conditions therein. In the depicted embodiment, the vaporizer 238 converts a portion of liquid treatment compound 300 to a vapor and delivers the vapor to the delivery module 204.

Figure 8:
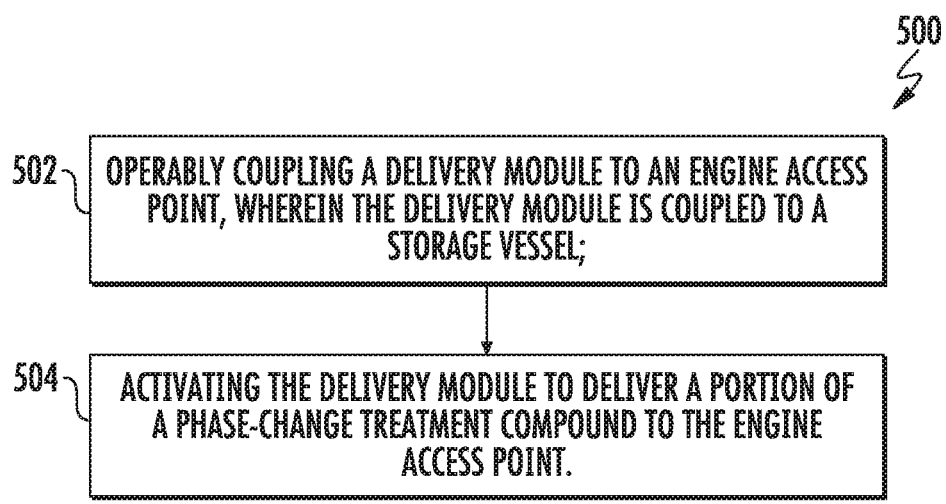
FIG. 8 illustrates a flow diagram of one embodiment of a method for cleaning, restoring and protecting gas turbine engine components in accordance with aspects of the present subject matter.

Referring now to FIG. 8, a flow diagram of a method 500 is shown for treating one or more components of an aircraft-mounted gas turbine engine. The exemplary method 500 includes at 502 operably coupling the delivery module to an engine access point. The delivery module is also coupled to a storage vessel. The exemplary method 500 includes at 504 activating the delivery module to deliver a portion of a treatment compound to the engine access point. The treatment compound is a supersaturated vapor upon entering an engine air-path. The supersaturated vapor may have a delivery temperature for a corresponding a delivery pressure. The delivery temperature is greater than a surface temperature of a component surface such that the vapor changes phase on the component surface.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high pressure, HP) turbine 128 for driving the high pressure compressor 124 via a first (high pressure, HP) drive shaft 130, and then to a second (low pressure, LP) turbine 132 for driving the booster compressor 122 and fan section 116 via a second (low pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shafts 130, 134.

Additionally, as shown in FIG. 1, the fan section 116 of the engine 100 may generally include a rotatable, axial-flow fan rotor 138 surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a speed reduction device 137 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 140 may be supported relative to the core engine 114 by a plurality of substantially radially-extending, circumferentially-spaced outlet guide vanes 142. As such, the fan casing 140 may enclose the fan rotor 138 band its corresponding fan rotor blades 144. Moreover, a downstream section 146 of the fan casing 140 may extend over an outer portion of the core engine 114 to define a secondary, or by-pass, airflow conduit 148 that provides additional propulsive jet thrust.

During operation of the engine 100, it should be appreciated that an initial air flow (indicated by arrow 150) may enter the engine 100 through an associated inlet 152 of the fan casing 140. The air flow 150 then passes through the fan blades 144 and splits into a first compressed air flow (indicated by arrow 154) that moves through conduit 148 and a second compressed air flow (indicated by arrow 156) which enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

Figure 7:
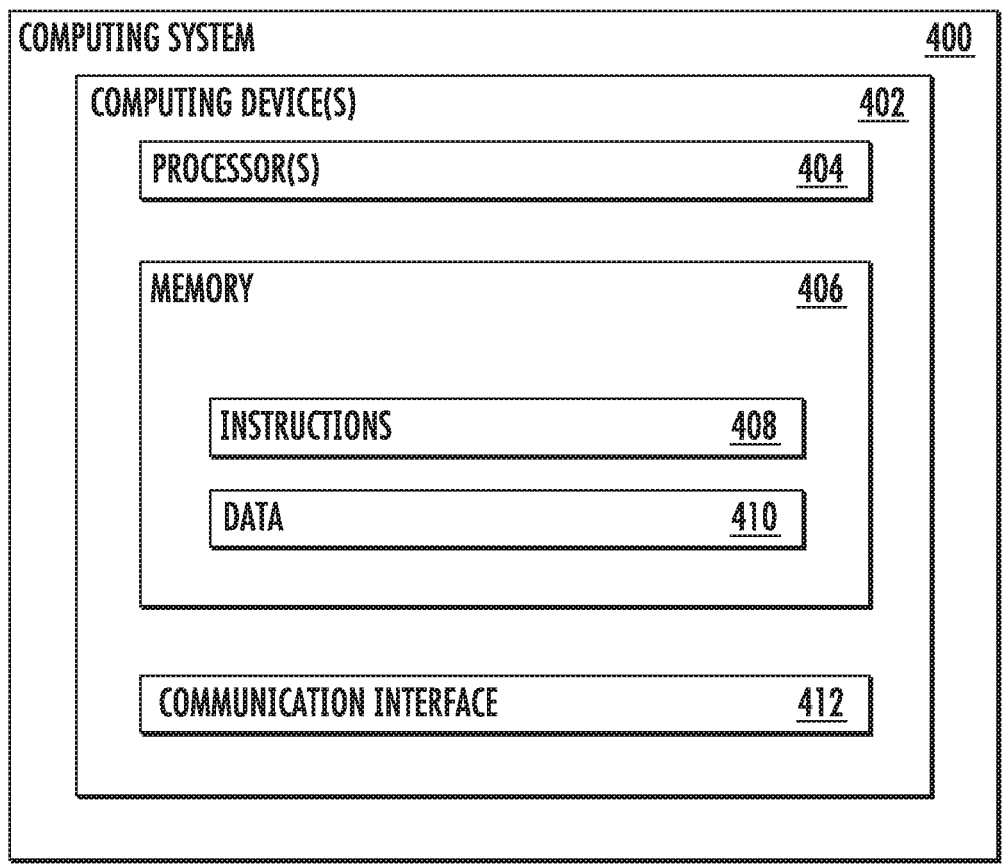
FIG. 7 depicts an exemplary controller such as for use in the exemplary systems of FIGS. 2-6.

FIG. 7 provides a block diagram of an exemplary computing system 400 that is representative of an embodiment of controller 208 that may be used to implement the methods and systems described herein according to exemplary embodiments of the present disclosure. Though described below as a computing system, it should be appreciated that in some embodiments, the controller may be an analog system or an electrical system that does not include a computing device. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform operations, such as implementing one or more of the processes mentioned above.

The memory device(s) 404 may further store data 410 that may be accessed by the processor(s) 404. For example, the data 410 may include a third instance of shared data for a gas turbine engine, as described herein. The data 410 may include one or more table(s), function(s), algorithm(s), model(s), equation(s), etc. according to example embodiments of the present disclosure.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A vapor-based system for treating one or more components of a gas turbine engine, the system comprising:
    a treatment compound heated to a delivery temperature for a corresponding delivery pressure, wherein the delivery temperature is greater than an engine component surface temperature, and wherein the treatment compound is a cleaning agent, a restorative agent, or a protective agent, wherein the treatment compound is a water-based compound;
    a storage vessel containing the treatment compound, wherein the storage vessel is a pressure vessel holding a portion of the treatment compound as a vapor or wherein the storage vessel is a pressure vessel holding a portion of the treatment compound in a liquid state and is operably coupled to a vaporizer; and
    a delivery module operably coupled to the storage vessel and to an engine access point, wherein the delivery module is operable to deliver the treatment compound at one or more locations of the gas turbine engine such that the treatment compound is a supersaturated vapor when delivered through an engine air-path so as to treat the engine component.

2. The vapor-based system of claim 1, wherein the delivery module further comprises:
    a hose; and
    a fuel system coupler operably coupling the delivery module to a fuel system, wherein the engine access point is a fuel injector nozzle.

3. The vapor-based system of claim 1, wherein the treatment compound is a protective compound.

4. The vapor-based system of claim 1, wherein the storage vessel is a first storage vessel, the vapor-based system further comprising:
    a second storage vessel;
    wherein the treatment compound further comprises a first active ingredient held in the first storage vessel and a second active ingredient held in the second storage vessel; and
    wherein the delivery module further comprises a mixing chamber operably coupled to the first storage vessel and the second storage vessel.

5. The vapor-based system of claim 1, wherein the storage vessel is the pressure vessel holding a portion of the treatment compound as a vapor, the vapor-based system further comprising:
    a pressure control mechanism coupled to the pressure vessel and a temperature control mechanism coupled to the pressure vessel.

6. The vapor-based system of claim 1, wherein the storage vessel is the pressure vessel holding the portion of the treatment compound in the liquid state and is operably coupled to the vaporizer, the vapor-based system further comprising:
    a first pressure control mechanism coupled to the pressure vessel and a first temperature control mechanism coupled to the pressure vessel; and
    wherein the vaporizer is further operably coupled to the delivery module, and wherein the vaporizer comprises a second temperature control mechanism and a second pressure control mechanism.

7. The vapor-based system of claim 1, wherein the storage vessel is the pressure vessel holding the portion of the treatment compound in the liquid state and is operably coupled to the vaporizer, and wherein the delivery module is a liquid delivery module, the vapor-based system further comprising:
    a pressure control mechanism coupled to the pressure vessel and a temperature control mechanism coupled to the pressure vessel;
    an engine air-path temperature, the engine air-path temperature being less than the delivery temperature; and
    an engine air-path pressure, the engine air-path pressure being less than the delivery pressure.

8. The vapor-based system of claim 1, further comprising:
    a discharge collector positioned to capture a vapor-based system waste fluid.

9. The vapor-based system of claim 1, wherein the delivery temperature is a compound deposition temperature, wherein the compound deposition temperature is the temperature at which a portion of the treatment compound changes phase and condenses on the engine component surface.

10. The vapor-based system of claim 1, wherein an engine component that is to be treated has an engine component surface temperature and wherein the system is configured so that the delivery temperature of the supersaturated vapor is greater than the engine component surface temperature.

11. The vapor-based system of claim 10, wherein the delivery module is operable to deliver the treatment compound to the engine component such that the supersaturated vapor changes phase on a surface of the engine component.

12. A method for treating one or more components of an aircraft-mounted gas turbine engine, the method comprising:
    operably coupling a delivery module to an engine access point, wherein the delivery module is coupled to a storage vessel, wherein the storage vessel contains the treatment compound, wherein the storage vessel is a pressure vessel holding a portion of the treatment compound as a vapor or wherein the storage vessel is a pressure vessel holding a portion of the treatment compound in a liquid state and is operably coupled to a vaporizer, and wherein the treatment compound is a cleaning agent, a restorative agent, or a protective agent, wherein the treatment compound is a water-based compound;
    activating the delivery module to deliver a portion of the treatment compound to the engine access point, wherein the treatment compound is a supersaturated vapor when delivered through an engine air-path, the supersaturated vapor heated to a delivery temperature for a corresponding delivery pressure, wherein the delivery temperature is greater than a surface temperature of a component surface such that the vapor changes phase on the component surface.

13. The method of claim 12, further comprising:
    circulating, via motoring of the gas turbine engine, the treatment compound through at least a portion of the gas turbine engine as mounted on the aircraft such that the treatment compound contacts a surface of the one or more components.

14. The method of claim 12, wherein the engine access point is a fuel system, an engine exhaust nozzle, or an inlet of a fan section.

15. The method of claim 12, wherein the storage vessel is a first storage vessel and the treatment compound is a first active ingredient, the method for treatment further comprising:
   introducing a second active ingredient of the treatment compound held in a second storage vessel;
   producing the treatment compound by mixing the first active ingredient with the second active ingredient in a mixing chamber operably coupled to the delivery module; and
   delivering a portion of the mixed treatment compound to the delivery module.

16. The method of claim 12, wherein the storage vessel is the pressure vessel holding the portion of the treatment compound in the vapor state, the method for treatment further comprising:
   maintaining a pressure with a pressure control mechanism coupled to the pressure vessel;
   maintaining a temperature with a temperature control mechanism coupled to the pressure vessel;
   wherein holding the portion of the treatment compound in the vapor state comprises
   holding the portion of the treatment compound in the vapor state in the pressure vessel with at least one of the pressure control mechanism and the temperature control mechanism; and
   delivering the portion of the treatment compound in vapor form to the engine air-path.

17. The method of claim 12, wherein the storage vessel is the pressure vessel holding the portion of the treatment compound in the liquid state and is operably coupled to the vaporizer, the method for treatment further comprising:
   maintaining a first pressure with a pressure control mechanism coupled to the pressure vessel;
   maintaining a first temperature with a temperature control mechanism coupled to the pressure vessel;
   holding the treatment compound in the liquid state in the pressure vessel with at least one of the pressure control mechanism and the temperature control mechanism.

18. The method of claim 17, wherein the delivery module further comprises:
   a hose, a fuel system coupler operably coupling the delivery module to a fuel system, and wherein the engine access point is a fuel injector nozzle.

19. The method of claim 12, wherein the storage vessel is the pressure vessel holding the portion of the treatment compound in the liquid state and is operably coupled to the vaporizer, the method for treatment further comprising:
   maintaining a first pressure with a first pressure control mechanism coupled to the pressure vessel;
   maintaining a first temperature with a first temperature control mechanism coupled to the pressure vessel;
   holding the portion of the treatment compound in a liquid state in the pressure vessel with at least one of the first pressure control mechanism and the first temperature control mechanism;
   the vaporizer comprising a second temperature control mechanism and a second pressure control mechanism;
   establishing a vaporization condition within the vaporizer with at least one of the second pressure control mechanism and the second temperature control mechanism;
   vaporizing a portion of the treatment compound in the vaporizer; and
   delivering the treatment compound to the delivery module.

* * * * *